US011919296B2

(12) United States Patent
Yamazaki et al.

(10) Patent No.: US 11,919,296 B2
(45) Date of Patent: Mar. 5, 2024

(54) PRINTING APPARATUS AND PRINTING METHOD

(71) Applicant: Seiko Epson Corporation, Tokyo (JP)

(72) Inventors: Shinya Yamazaki, Shiojiri (JP); Tomohiro Yoda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 150 days.

(21) Appl. No.: 17/528,975

(22) Filed: Nov. 17, 2021

(65) Prior Publication Data

US 2022/0161551 A1 May 26, 2022

(30) Foreign Application Priority Data

Nov. 20, 2020 (JP) ................................ 2020-193324

(51) Int. Cl.

*B41J 2/045* (2006.01)
*B41J 2/14* (2006.01)
*B41J 2/165* (2006.01)
*B41J 2/21* (2006.01)
*B41J 11/00* (2006.01)

(52) U.S. Cl.

CPC ......... *B41J 2/0451* (2013.01); *B41J 2/04556* (2013.01); *B41J 2/04581* (2013.01); *B41J 2/14201* (2013.01); *B41J 2/16517* (2013.01); *B41J 2/16579* (2013.01); *B41J 2/2139* (2013.01); *B41J 2/2142* (2013.01); *B41J 11/0095* (2013.01); *B41J 2002/16573* (2013.01)

(58) Field of Classification Search

CPC ...... B41J 2/2132; B41J 2/2139; B41J 2/0451; B41J 2/16579; B41J 2/2142; B41J 2/16517; B41J 2/16526; B41J 2/16532; B41J 2002/16573

See application file for complete search history.

(56) References Cited

U.S. PATENT DOCUMENTS

2009/0225119 A1* 9/2009 Huyghen ............. B41J 2/16579 347/14
2014/0009534 A1* 1/2014 Yamamoto ............. B41J 2/2139 347/35
2018/0001621 A1* 1/2018 Hosokawa ........... B41J 2/04593
2018/0215142 A1 8/2018 Ishikawa

FOREIGN PATENT DOCUMENTS

JP 2018-122517 8/2018

* cited by examiner

*Primary Examiner* — Shelby L Fidler
(74) *Attorney, Agent, or Firm* — WORKMAN NYDEGGER

(57) ABSTRACT

A printing apparatus includes a head including a plurality of nozzles configured to discharge liquid to a medium, an abnormal nozzle detection unit configured to detect an abnormal nozzle having a discharging defect among the plurality of nozzles, a contact detection unit configured to detect contact between the head and the medium, a suction unit configured to perform an ejection operation of ejecting the liquid from the plurality of nozzles, and a control unit. The control unit executes a suction operation when the abnormal nozzle is detected and the contact between the head and the medium is detected, and the control unit executes a printing of complementing the abnormal nozzle when the abnormal nozzle is detected and the contact between the head and the medium is not detected.

6 Claims, 10 Drawing Sheets

PRINTING APPARATUS AND PRINTING METHOD

The present application is based on, and claims priority from JP Application Serial Number 2020-193324, filed Nov. 20, 2020, the disclosure of which is hereby incorporated by reference herein in its entirety.

BACKGROUND

1. Technical Field

The present disclosure relates to a printing apparatus and a printing method.

2. Related Art

In the related art, a printing apparatus that detects contact between a head that discharges liquid and a medium is known. For example, JP-A-2018-122517 discloses a printing apparatus that controls a printing operation in accordance with the amount of displacement caused by contact between a displacement unit provided in a carriage in which a head is mounted and a medium.

The printing apparatus disclosed in JP-A-2018-122517 performs head cleaning by stopping the printing operation in accordance with the degree of the contact between the head and the medium. However, the relationship between contact between the head and the medium, and nozzle clogging that requires cleaning is unclear. In other words, the nozzle may not be clogged every time when the head and the medium make contact with each other, and further, cleaning may not be immediately required every time when the nozzle is clogged. As such, the printing apparatus disclosed in JP-A-2018-122517 causes reduction in printing efficiency by performing unnecessary cleaning.

SUMMARY

A printing apparatus includes a head including a plurality of nozzles configured to discharge liquid to a medium, an abnormal nozzle detection unit configured to detect an abnormal nozzle having a discharging defect among the plurality of nozzles, a contact detection unit configured to detect contact between the head and the medium, an ejection unit configured to perform an ejection operation of ejecting the liquid from the plurality of nozzles, and a control unit. The control unit executes the ejection operation when the abnormal nozzle is detected and the contact between the head and the medium is detected, and the control unit executes complementary printing of complementing the abnormal nozzle when the abnormal nozzle is detected and the contact between the head and the medium is not detected.

A printing method is a method for a printing apparatus including: a head including a plurality of nozzles configured to discharge liquid to a medium, an abnormal nozzle detection unit configured to detect an abnormal nozzle having a discharging defect among the plurality of nozzles, a contact detection unit configured to detect contact between the head and the medium, and an ejection unit configured to perform an ejection operation of ejecting the liquid from the plurality of nozzles. The method includes detecting the abnormal nozzle, detecting the contact between the head and the medium, executing the ejection operation when the abnormal nozzle is detected and the contact between the head and the medium is detected, and executing complementary printing of complementing the abnormal nozzle when the abnormal nozzle is detected and the contact between the head and the medium is not detected.

DESCRIPTION OF EXEMPLARY EMBODIMENTS

1. Embodiment

Figure 1:
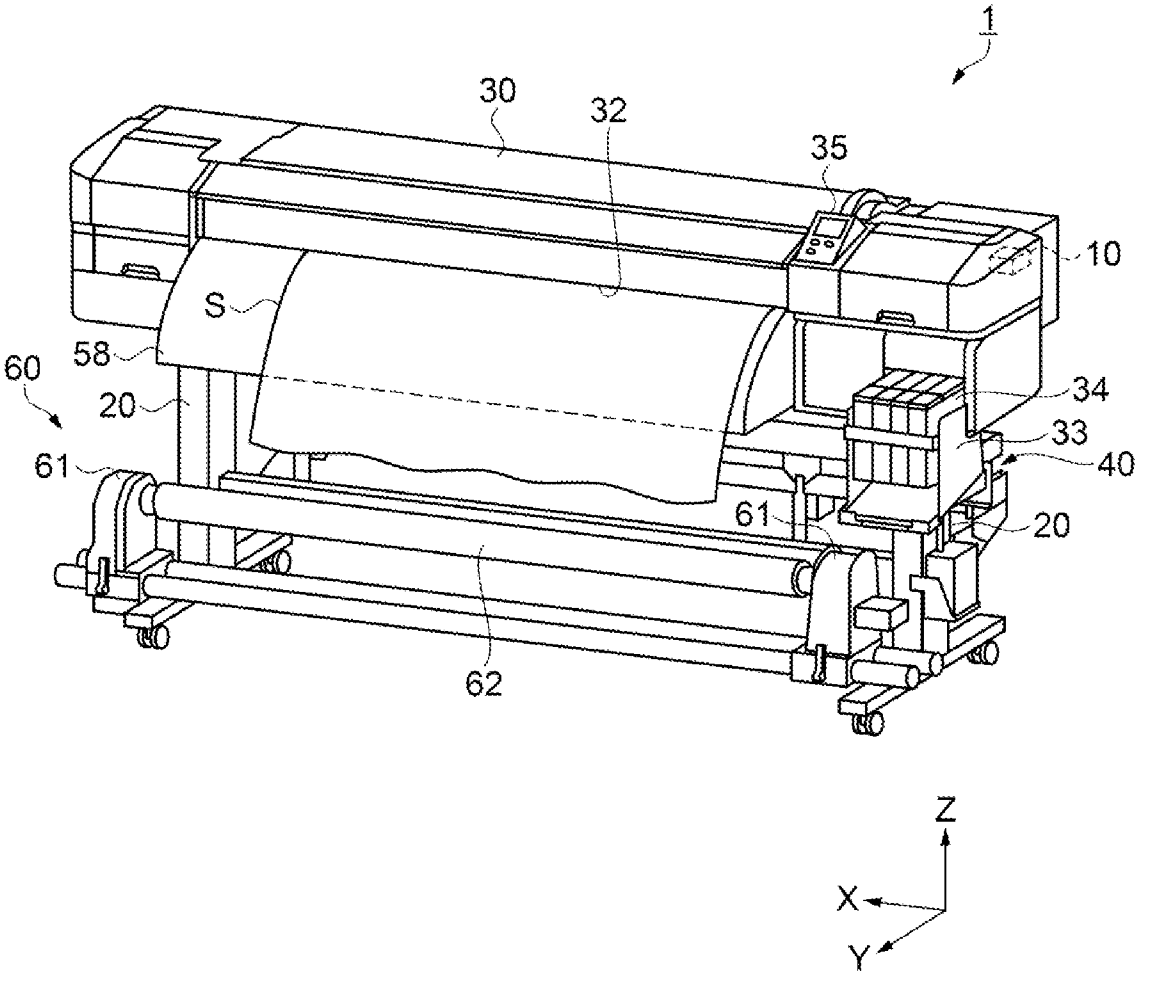
FIG. 1 is a perspective view illustrating a configuration of a printing apparatus according to an embodiment.

An outline of a configuration of a printing apparatus 1 according to an embodiment is described below. Note that in the coordinates indicated in the drawings, the both directions along the Z axis are vertical directions, and the arrow direction is "up". The both directions along the X axis are the horizontal directions, and the arrow direction is "left". The both directions along the Y axis are the front-rear directions, and the arrow direction is "front". In addition, the both directions along the X axis correspond to the main scanning direction, and the Y axis corresponds to the conveyance direction in a printing unit 70. In addition, the positional relationship along the conveyance direction of a medium S is referred to also as "upstream" and "downstream".

Figure 2:
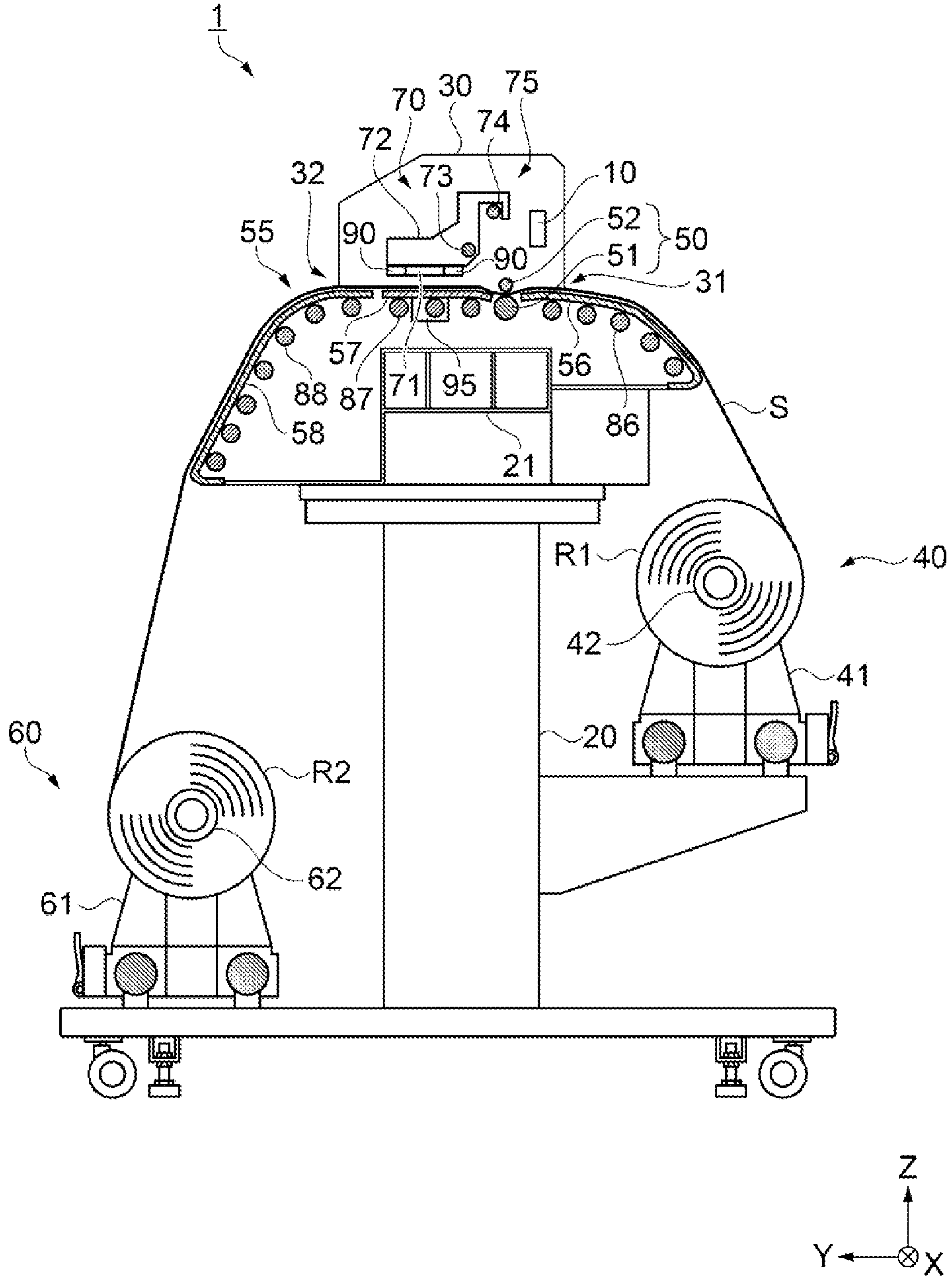
FIG. 2 is a sectional view illustrating a schematic configuration of the printing apparatus.

As illustrated in FIG. 1 and FIG. 2, the printing apparatus 1 includes a supply unit 40, a conveyance unit 50, a guide unit 55, a winding unit 60, the printing unit 70, a suction unit 95, and a control unit 10 that controls each unit of the printing apparatus 1. The supply unit 40 and the winding unit 60 are provided at a pair of leg parts 20 separated in the X direction. The conveyance unit 50 and the guide unit 55 are supported by a base frame 21 provided across the pair of leg parts 20. The printing unit 70 and the control unit 10 are provided inside a substantially cuboid housing 30 elongated in the X axis direction and supported by the base frame 21 above the conveyance unit 50 and the guide unit 55.

The supply unit 40 is provided at a rear lower portion of the housing 30. At the supply unit 40, a roll body R1 of unused medium S wound around a core tube 42 is held. The supply unit 40 includes a pair of holders 41 that sandwiches the both ends of the core tube 42. At one of the holders 41, a motor that supplies a turning force to the core tube 42 is provided. When the motor is driven and the core tube 42 is rotated, the medium S unwound from the roll body R1 is sent to the printing unit 70. Note that at the supply unit 40, the roll bodies R1 of multiple sizes with different widths and number of rolls are mounted in a replaceable manner.

The winding unit 60 is provided at a front lower portion of the housing 30. At the winding unit 60, the medium S printed at the printing unit 70 is wound around a core tube 62 and a roll body R2 is formed. The winding unit 60 includes a pair of holders 61 that sandwiches the both ends of the core tube 62. At one of the holders 61, a motor that supplies a turning force to the core tube 62 is provided. When the motor is driven and the core tube 62 is rotated, the medium S is wound around the core tube 62. Note that the winding unit 60 may include a tension roller that presses the rear surface side of the medium S that hangs down by its own weight to apply a tensile force to the medium S to be wound around the core tube 62.

The guide unit 55 includes an upstream guide unit 56, a platen 57, and a downstream guide unit 58. The platen 57, which has a plate-shape elongated in the X axis direction, is provided at a position opposite to the printing unit 70. The platen 57 supports from below the medium S printed at the printing unit 70. The upstream guide unit 56 is provided upstream of the platen 57. In addition, in the back surface of the housing 30, a supply port 31 for supplying the medium S into the housing 30 is formed at a position above the upstream guide unit 56. The upstream guide unit 56 guides the medium S supplied from the supply unit 40, to the platen 57 through the supply port 31. The downstream guide unit 58 is provided downstream of the platen 57. In addition, in the front surface of the housing 30, an ejection port 32 for ejecting the medium S to the outside of the housing 30 is formed at a position above the downstream guide unit 58. The downstream guide unit 58 guides the medium S printed at the printing unit 70, to the winding unit 60 through the ejection port 32.

The printing apparatus 1 includes a first heater 86, a second heater 87 and a third heater 88 for heating the medium S. The first, second and third heaters 86, 87 and 88 are, for example, tube heaters, and are bonded to the bottom surfaces of the upstream guide unit 56, the platen 57 and the downstream guide unit 58, respectively through an aluminum tape and the like. The first heater 86 is a heater that heats the upstream guide unit 56, and gradually increases the temperature of the medium S supported by the upstream guide unit 56 from the normal temperature to a target temperature. The second heater 87 is a heater that heats the platen 57, and keeps the temperature of the medium S on the platen 57 opposite the printing unit 70 at a target temperature of 40° C. The third heater 88 is a heater that heats the downstream guide unit 58, and heats the medium S supported by the downstream guide unit 58 to 50° C. higher than the target temperature. In this manner, ink as liquid discharged to the medium S is immediately dried and fixed, and thus a high-quality image with little exuding or blurring is formed.

The conveyance unit 50 includes a driving roller 51 that drives into rotation on the lower side of the medium S, a driven roller 52 that rotates to follow the rotation of the driving roller 51 on the upper side of the driving roller 51, and a motor that supplies a turning force to the driving roller 51. The driving roller 51 is extended in a direction that intersects the conveyance direction of the medium S, and is provided between the platen 57 and the upstream guide unit 56. The driven roller 52 is configured to be movable to be separated from or brought into pressure contact with the driving roller 51. When the motor is driven and the driving roller 51 drives into rotation, the medium S sandwiched between the driven roller 52 and the driving roller 51 is conveyed in the conveyance direction.

The printing unit 70 is disposed above the position where the platen 57 is disposed. The printing unit 70 includes a head 71 that discharges ink to the medium S on the platen 57, a carriage 72 in which the head 71 is mounted, and a head movement unit 75 that moves the carriage 72 in the main scanning direction. In addition, a contact detection unit 90 is provided upstream and downstream of the head 71 along the conveyance direction.

The head movement unit 75 moves the carriage 72 in the main scanning direction. The carriage 72 is supported by guide rails 73 and 74 disposed along the X axis so as to be movable back and forth by the head movement unit 75 in the main scanning direction. As the mechanism of the head movement unit 75, for example, a mechanism of a combination of a ball screw and a ball nut, a linear guide mechanism and the like may be adopted. Further, the head movement unit 75 includes a motor that is a power source for moving the carriage 72 along the X-axis direction. When the motor is driven, the head 71 moves back and forth in the main scanning direction together with the carriage 72. The head 71 discharges ink to the medium S while moving in the main scanning direction, and thus printing is performed.

An operation unit 35 for performing a setting operation and an inputting operation is provided at an upper right portion of the housing 30. A container mounting unit 33 capable of mounting an ink housing container 34 that can contain ink is provided at a lower right portion of the housing 30. A plurality of the ink housing containers 34 corresponding to the types and colors of ink are mounted in the container mounting unit 33. The ink housing container 34 and the head 71 are coupled together with a flexible tube, and the ink is supplied to the head 71.

Figure 3:
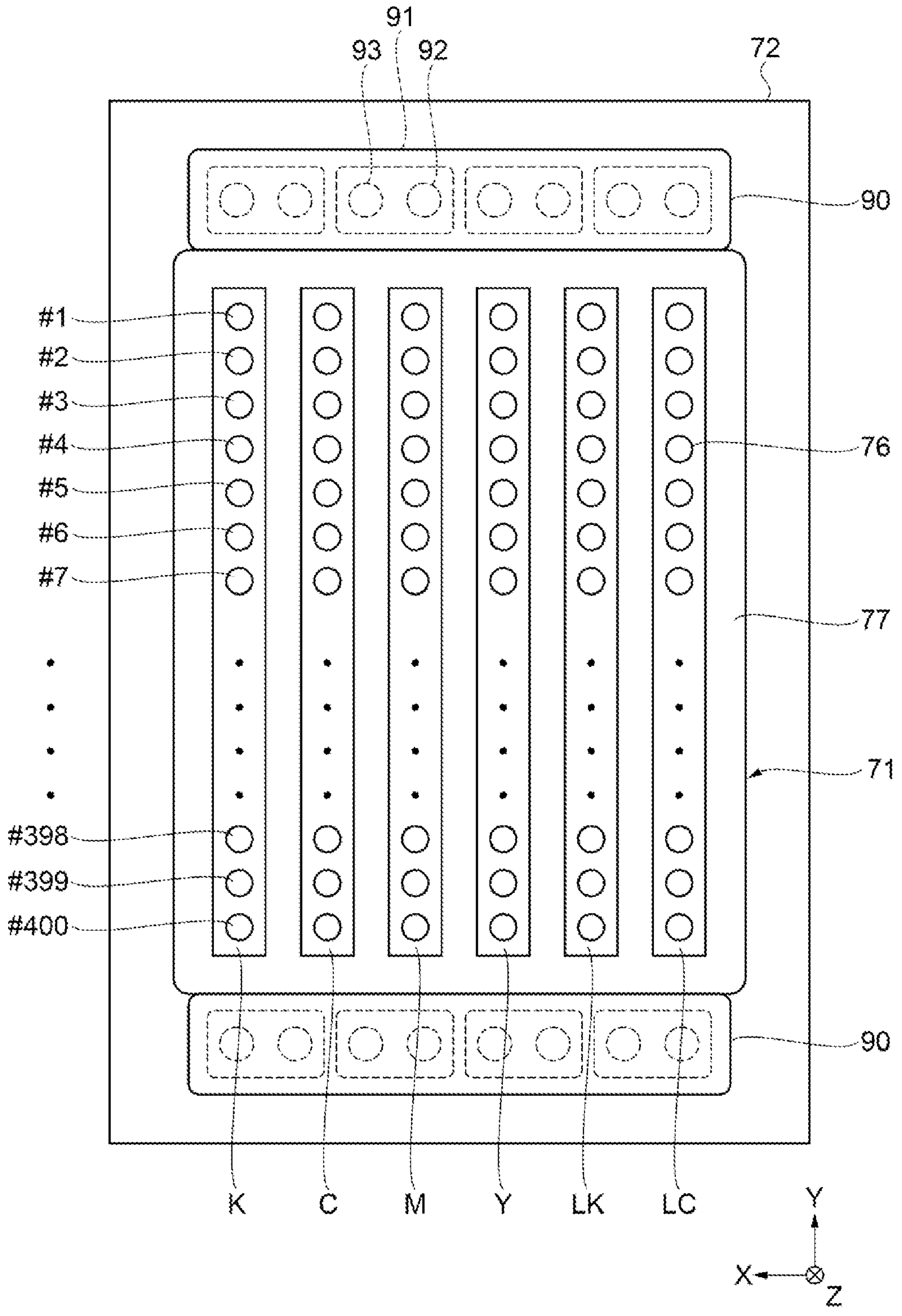
FIG. 3 is a plan view illustrating an arrangement of a head and a contact detection unit.

As illustrated in FIG. 3, the head 71 includes a nozzle plate 77 in which a plurality of nozzles 76 that discharges various types of ink to the medium S is formed. For example, the head 71 includes a nozzle line K that discharges black ink, a nozzle line C that discharges cyan ink, a nozzle line M that discharges magenta ink, a nozzle line Y that discharges yellow ink, a nozzle line LK that discharges grey ink, and a nozzle line LC that discharges light cyan ink. Each of the nozzle lines K, C, M, Y, LK and LC is composed of 400 nozzles 76 of #1 to #400.

The contact detection unit 90 is composed of a plurality of ultrasound distance sensors 91. The distance sensor 91 includes a transmission unit 92 that sends out ultrasound waves to the medium S, and a reception unit 93 that receives the ultrasound waves reflected by the medium S. The distance sensor 91 determines the distance between the medium S and the distance sensor 91 on the basis of the time from emission of ultrasound waves from the transmission unit 92 to reception of the ultrasound waves at the reception unit 93. Whether the medium S has made contact with the head 71 can be detected based on this distance.

The suction unit 95 is an example of an ejection unit that performs an ejection operation of ejecting liquid from the nozzle.

The suction unit 95 is an apparatus that lids the head 71 and performs a suction operation as an example of an ejection operation of suctioning the ink in the head 71 from the plurality of nozzles 76. The suction unit 95 is provided outside on one side of the platen 57 in the X direction. The suction unit 95 is disposed at a position overlapping the head 71 that moves back and forth in the X direction in plan view in the +Z direction. The suction unit 95 includes a negative pressure pump not illustrated in the drawing, and suctions the ink in the head 71 by driving the negative pressure pump with the head 71 lidded. In this manner, bubbles, foreign matters and the like mixed in the head 71 are removed, and the discharging at the nozzle 76 where nozzle clogging is caused can be restored. Note that while a suction operation of suctioning the ink by suctioning the head 71 is described as an example of the ejection operation in this embodiment, it is also possible to adopt a pressing operation of forcibly ejecting liquid from the nozzle 76 by pressurizing the ink to be supplied to the head 71. In addition, the suction unit 95 is one cleaning unit for cleaning the head 71. As the cleaning unit, it is possible to adopt a configuration including a wiper that wipes the nozzle plate 77, a flushing box that accepts ink forcibly ejected from the nozzle 76 and the like, as well as the suction unit 95.

Next, internal structures of the head 71 are described.

Figure 4:
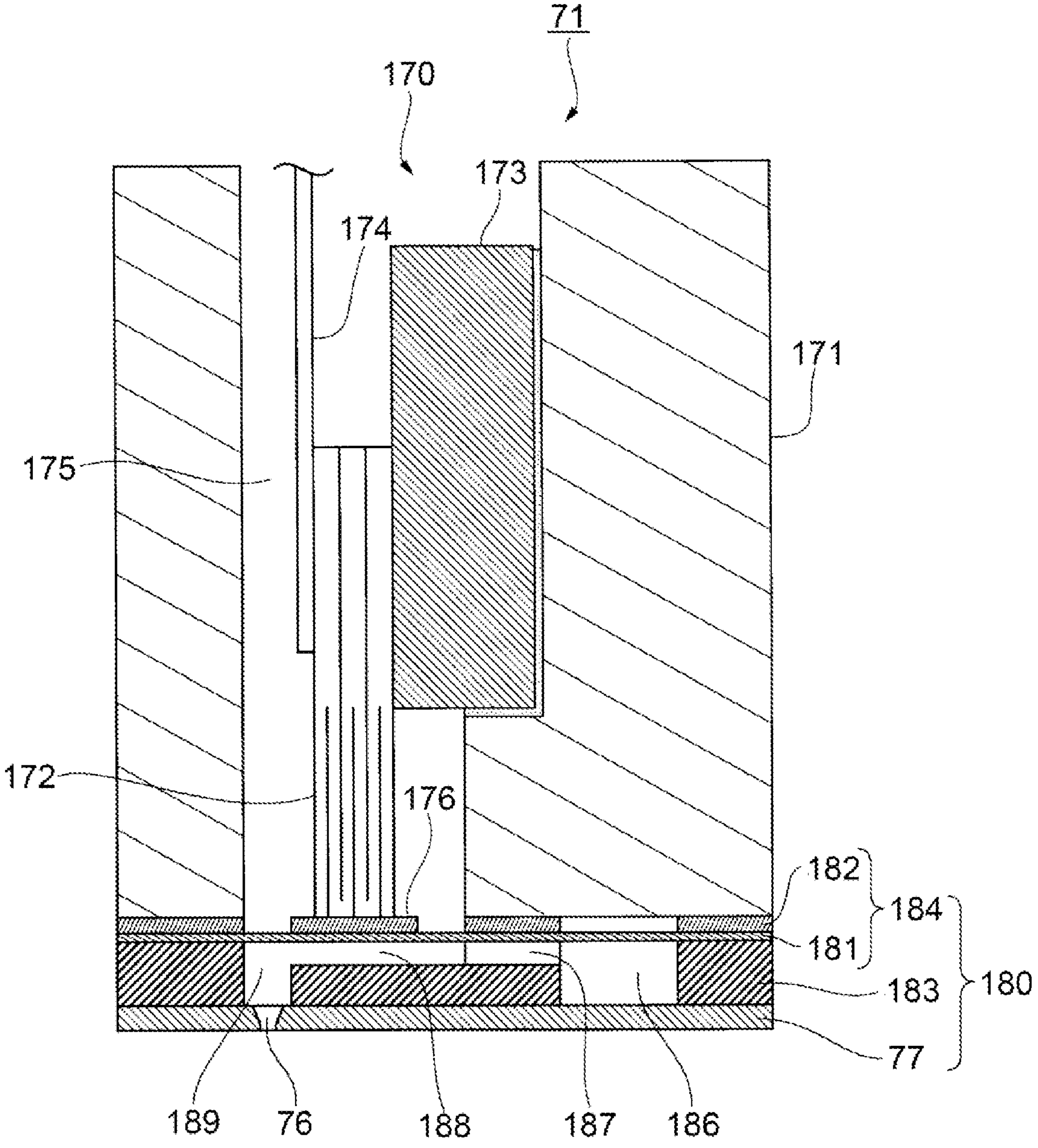
FIG. 4 is a sectional view illustrating an internal configuration of the head.

As illustrated in FIG. 4, the head 71 includes a piezoelectric element unit 170 as a unit composed of a plurality of piezoelectric elements 172, a fixation plate 173, a flexible cable 174 and the like, a case 171 that can house the piezoelectric element unit 170, and a channel unit 180 joined to an end surface of the case 171. The piezoelectric element 172 functions as an actuator that discharges ink from each nozzle 76.

The case 171 is a block member made of synthetic resin in which a hollow housing unit 175 with open front and rear ends is formed, and the piezoelectric element unit 170 is housed and fixed in the hollow housing unit 175.

The piezoelectric element 172 is formed in a comb-tooth shape that is slender in the vertical direction. This piezoelectric element 172 is a laminated piezoelectric transducer composed of alternating layers of a piezoelectric body and an inner electrode, and is of a vertical vibration mode that is extendable in the vertical direction orthogonal to the lamination direction. The end surface of each piezoelectric element 172 is joined to an island part 176 of the channel unit 180.

Note that this piezoelectric element 172 operates like a capacitor. Specifically, when the supply of signals is stopped, the potential of the piezoelectric element 172 is held at the potential of the state immediately before the stop.

The channel unit 180 is composed of layers of the nozzle plate 77 disposed on one surface side of the channel formation substrate 183 and an elastic plate 184 disposed on the other surface side on the side opposite to the nozzle plate 77, with a channel formation substrate 183 sandwiched therebetween.

The nozzle plate 77 is composed of a thin metal plate member in which the plurality of nozzles 76 is formed along the Y direction. The channel formation substrate 183 is a plate-shaped member in which a continuous ink channel composed of a common ink chamber 186, an ink supply port 187, a pressure chamber 188, and a nozzle communication port 189 is formed. In this embodiment, this channel formation substrate 183 is produced through an etching process on a silicon wafer. The elastic plate 184 is a composite plate member of a double structure obtained through lamination of a resin film 181 on a stainless-steel support plate 182, and the island part 176 is formed by annularly removing portions of the support plate 182 corresponding to the pressure chamber 188.

In this head 71, a continuous ink channel extending from the common ink chamber 186 to the nozzle 76 through the pressure chamber 188 is formed for each nozzle 76. Charging or discharging of the piezoelectric element 172 deforms the piezoelectric element 172. Specifically, the piezoelectric element 172 of the vertical vibration mode contracts in the transducer longitudinal direction by charging, and extends in the transducer longitudinal direction by discharging. Thus, when the potential is increased by charging, the island part 176 is pulled to the piezoelectric element 172 side, the resin film 181 in the region around the island part 176 is deformed, and the pressure chamber 188 is expanded. In addition, when the potential is reduced by discharging, the pressure chamber 188 contracts.

Since the volume of the pressure chamber 188 can be controlled in accordance with the potential in this manner, the ink in the pressure chamber 188 can be made to fluctuate in pressure, and the ink can be discharged from the nozzle 76. For example, ink droplets can be discharged by expanding the pressure chamber 188 of a steady volume and thereafter abruptly contracting the pressure chamber 188.

Note that while an example of a configuration using the piezoelectric element 172 of the vertical vibration type is described in this embodiment, this is not limitative. For example, it is also possible to use a piezoelectric transducer of a deflective displacement type composed of a lamination of a lower electrode, a piezoelectric body layer and an upper electrode.

Figure 5:
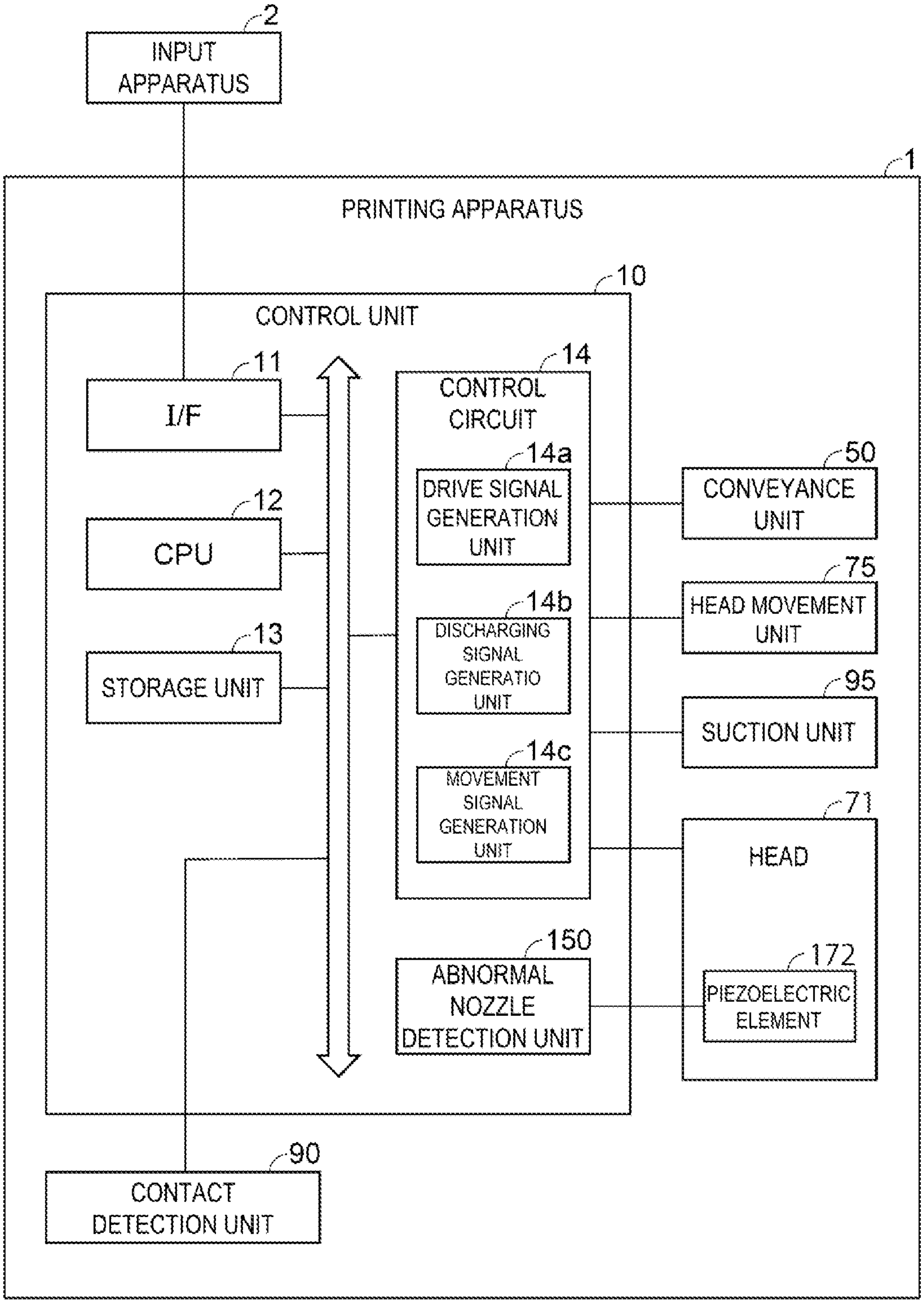
FIG. 5 is a block diagram illustrating an electric connection of the printing apparatus.

Next, an electrical configuration of the printing apparatus 1 is described with reference to FIG. 5.

The printing apparatus 1 records an image and the like on the medium S on the basis of image data input from an input apparatus 2. The input apparatus 2 is an apparatus that can store and transmit image data, such as a personal computer, a smartphone and a tablet terminal.

The printing apparatus 1 includes the control unit 10 that controls each unit provided in the printing apparatus 1. The control unit 10 includes an interface (I/F) unit 11, a central processing unit (CPU) 12, a storage unit 13, a control circuit 14, an abnormal nozzle detection unit 150 and the like.

The I/F unit 11 is configured to perform data exchange between the input apparatus 2 and the control unit 10, and receives image data and the like sent from the input apparatus 2.

The CPU 12 is a computation processing device that performs various input signal processes and generates printing data for executing printing based on received image data and the like. The CPU 12 controls the entire printing apparatus 1 on the basis of the program and printing data stored in the storage unit 13.

The storage unit 13 is a storage medium for ensuring the region for storing the program of the CPU 12, the processing region and the like, and includes memory elements such as a random access memory (RAM) and an electrically erasable programmable read only memory (EEPROM). In the storage unit 13, generally used image processing application software that handles image data, and printer driver software that generates printing data for causing the printing apparatus 1 to execute printing are stored.

The control circuit 14 is a circuit that generates a control signal for controlling the conveyance unit 50, the head movement unit 75, the suction unit 95, the head 71 and the like on the basis of printing data and a computation result of the CPU 12. The control circuit 14 includes a drive signal generation unit 14*a*, a discharging signal generation unit 14*b*, and a movement signal generation unit 14*c*.

The drive signal generation unit 14*a* is a circuit that generates a drive control signal for driving the piezoelectric element 172 corresponding to each nozzle 76. When a generated drive control signal is applied to the piezoelectric element 172, an ink is discharged from the nozzle 76.

The discharging signal generation unit 14*b* is a circuit that generates a discharging control signal for controlling the selection of the nozzle 76 for discharging ink, the discharge timing for discharging ink and the like on the basis of printing data and a computation result of the CPU 12.

The movement signal generation unit 14*c* is a circuit that generates a movement control signal for driving the conveyance unit 50 and the head movement unit 75 on the basis of printing data and a computation result of the CPU 12.

With a control signal output from the control circuit 14, the control unit 10 forms a raster line of dots aligned along the X axis on the medium S by performing a main scanning of moving the carriage 72 along the main scanning direction while discharging ink from the nozzle 76. In addition, with a control signal output from the control circuit 14, the control unit 10 performs a sub scanning of moving the medium S in the conveyance direction. By alternately performing the main scanning and the sub scanning, a desired image based on the image data is printed on the medium S. Note that in the following description, the main scanning is also referred to as "path".

With a control signal output from the control circuit 14, the control unit 10 performs a suction operation by controlling the suction unit 95. In addition, the control unit 10 receives a signal output from the contact detection unit 90, and detects contact between the medium S and the head 71.

The abnormal nozzle detection unit 150 detects an abnormal nozzle having a discharging defect due to nozzle clogging from among the plurality of nozzles 76. When a drive signal is input by the control unit 10 to the piezoelectric element 172, the piezoelectric element 172 vibrates and the ink is discharged from the nozzle 76. Then, at the piezoelectric element 172, a residual vibration is caused in a period until the next drive signal is input after the ink is discharged. At the piezoelectric element 172 corresponding to the nozzle 76 having a discharging defect due to bubbles mixed in the pressure chamber 188, the frequency of the residual vibration changes. The abnormal nozzle detection unit 150 detects an abnormal nozzle where having a discharging defect on the basis of the residual vibration of the piezoelectric element 172 corresponding to each nozzle 76.

Figure 6:
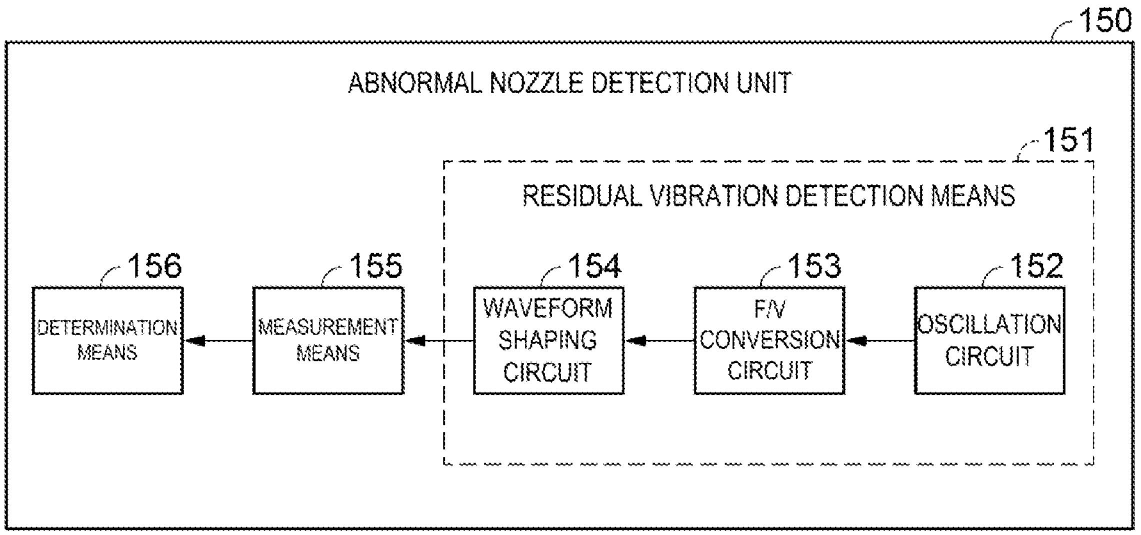
FIG. 6 is a block diagram illustrating a configuration of an abnormal nozzle detection unit.

As illustrated in FIG. 6, the abnormal nozzle detection unit 150 includes a residual vibration detection means 151, a measurement means 155, and a determination means 156. The residual vibration detection means 151 is composed of an oscillation circuit 152, an F/V conversion circuit 153, and a waveform shaping circuit 154. The measurement means 155 measures the frequency, the amplitude, and the like from the residual vibration waveform data detected by the residual vibration detection means 151. The determination means 156 determines the discharging defect of the nozzle 76 on the basis of the frequency measured by the measurement means 155 and the like.

In the residual vibration detection means 151, the oscillation circuit 152 oscillates on the basis of the residual vibration of the piezoelectric element 172, and a vibration waveform is formed from the oscillation frequency of the oscillation at the F/V conversion circuit 153 and the waveform shaping circuit 154, and detected. Then, the measurement means 155 measures the frequency of the residual vibration and the like on the basis of the detected vibration waveform, and the determination means 156 detects the discharging defect of the nozzle 76 on the basis of the measured frequency of the residual vibration and the like.

Note that while an example of the printing apparatus 1 with a configuration including the abnormal nozzle detection unit 150 that detects an abnormal nozzle on the basis of the residual vibration is described in this embodiment, the method of detecting an abnormal nozzle having a discharging defect may be a method of detecting ink discharged from the nozzle 76 using an optical sensor, or a method of reading and detecting dots of ink discharged to the medium S using a scanner.

Figure 7:
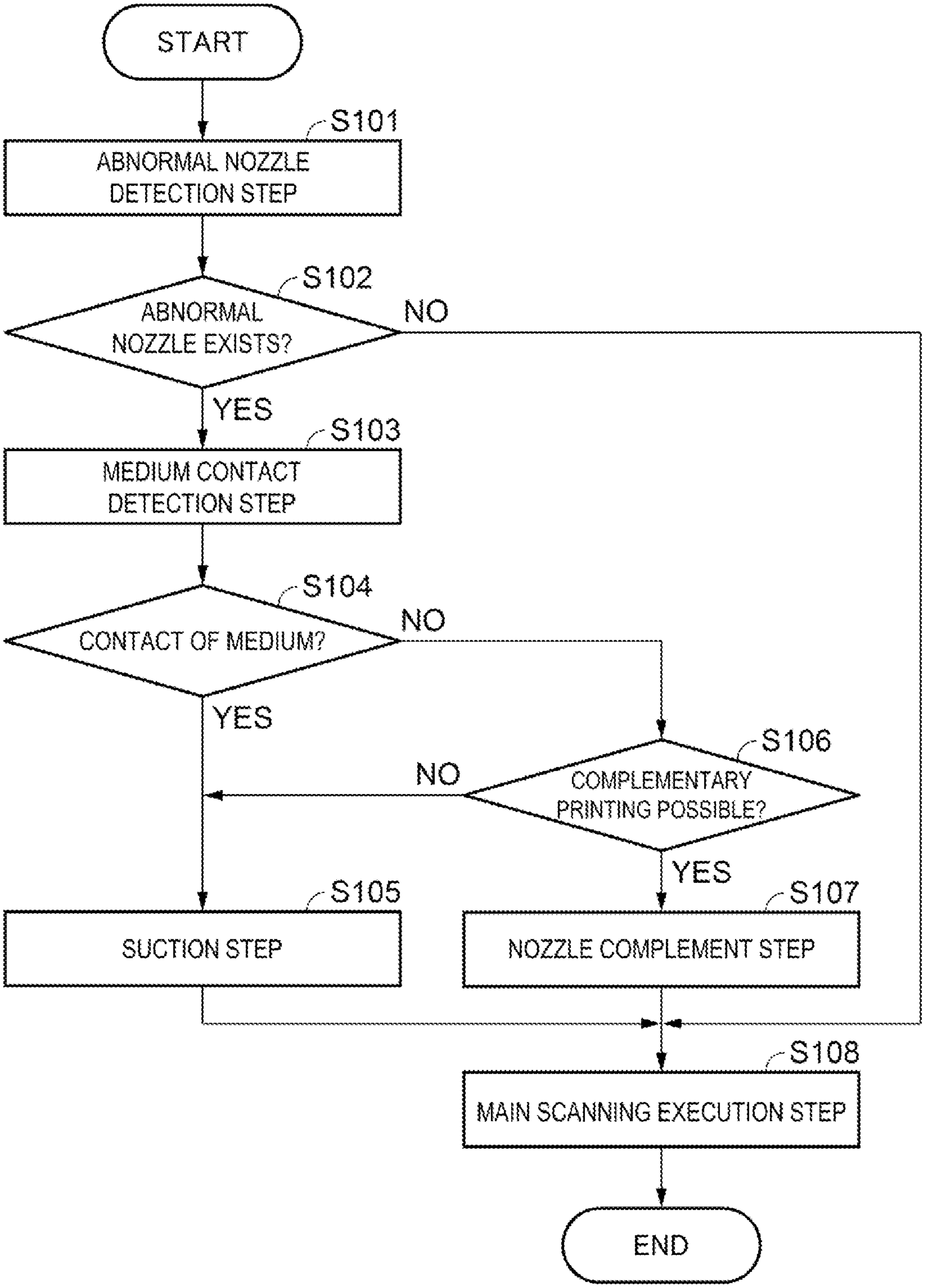
FIG. 7 is a flowchart of a printing method.

Next, a printing method of the printing apparatus 1 is described with reference to FIG. 7.

Step S101 is an abnormal nozzle detection step of detecting an abnormal nozzle. The abnormal nozzle detection unit 150 of the control unit 10 receives the residual vibration of the piezoelectric element 172 corresponding to each nozzle 76 that is caused by the path executed before the path of discharging ink from the nozzle 76 to be executed this time.

Step S102 is a step of determining whether there is an abnormal nozzle. The abnormal nozzle detection unit 150 determines whether there is an abnormal nozzle having a discharging defect on the basis of the received residual vibration of the piezoelectric element 172. In the case where there is an abnormal nozzle (step S102: Yes), the process is proceeded to step S103. In the case where when there is no abnormal nozzle (step S102: No), the process proceeds to the main scanning step of step S108.

Step S103 is a medium contact detection step of detecting contact between the head 71 and the medium S. The control unit 10 receives an output signal output from the contact detection unit 90 in the path executed before the path of discharging ink from the nozzle 76 to be executed this time.

Step S104 is a step of determining whether the head 71 and the medium S have made contact with each other. The control unit 10 determines whether the head 71 and the medium S have made contact with each other by calculating the distance between the contact detection unit 90 and the medium S from the received output signal. For example, the control unit 10 determines that the head 71 and the medium S have made contact with each other when a state where the height of the medium S is higher than the height of the head 71 by 0.2 mm or more is continued for 10 msec or longer. When the head 71 and the medium S have made contact with each other (step S104: Yes), the process is proceeded to step S105. When the head 71 and the medium S have not made contact with each other (step S104: No), the process is proceeded to step S106.

Step S105 is a suction step of executing a suction operation. In the case where an abnormal nozzle is detected and contact between the head 71 and the medium S is detected, it is highly possible that a bubble larger than the diameter of the nozzle 76 has mixed into the nozzle communication port 189 from the nozzle 76. If this bubble is left as it is, the interface between the bubble and the ink is dried and solidified. A large bubble cannot be ejected even when the suction operation of suctioning ink from the nozzle 76 is performed after the solidification, thus making it difficult to restore the discharging of the nozzle 76 where nozzle clogging is caused. In view of this, after the printing operation is stopped and the suction operation is executed, the control unit 10 proceeds to the main scanning execution step of step S108 and restarts the printing operation.

Step S106 is a determination step of determining whether complementary printing of complementing an abnormal nozzle is executable. When the number of detected abnormal nozzles is equal to or greater than a threshold value, the control unit 10 determines that the complementary printing is impossible. For example, the threshold value of the number of abnormal nozzles is set to 20. In the case where the complementary printing is impossible (step S106: No), the process is proceeded to step S105. In the case where the complementary printing is executable (step S106: Yes), the process is proceeded to step S107.

Here, an example of the complementary printing is described with reference to FIG. 8A to FIG. 9B. In the following description, the head 71 includes the nozzle line K formed of eight nozzles 76 aligned along the Y direction. Note that in FIG. 8B and FIG. 9B, the abnormal nozzle that cannot discharge ink is indicated by x. In addition, each drawing illustrates a relative position with the medium S and the head 71, an arrow indicating the movement direction of the head 71, and a position of a dot DT formed on the medium S.

Figure 8A:
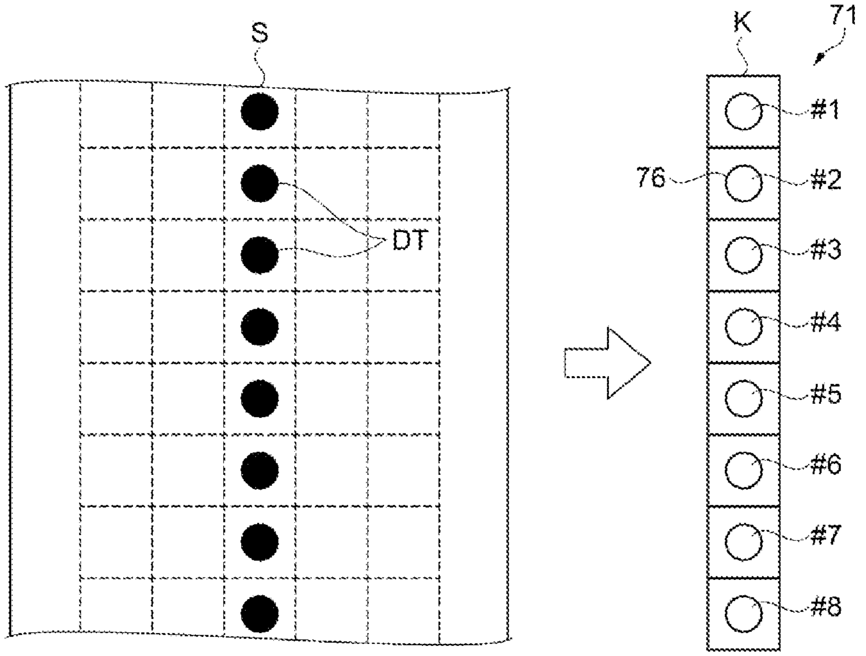
FIG. 8A is a diagram illustrating an example of a normal printing.
Figure 8B:
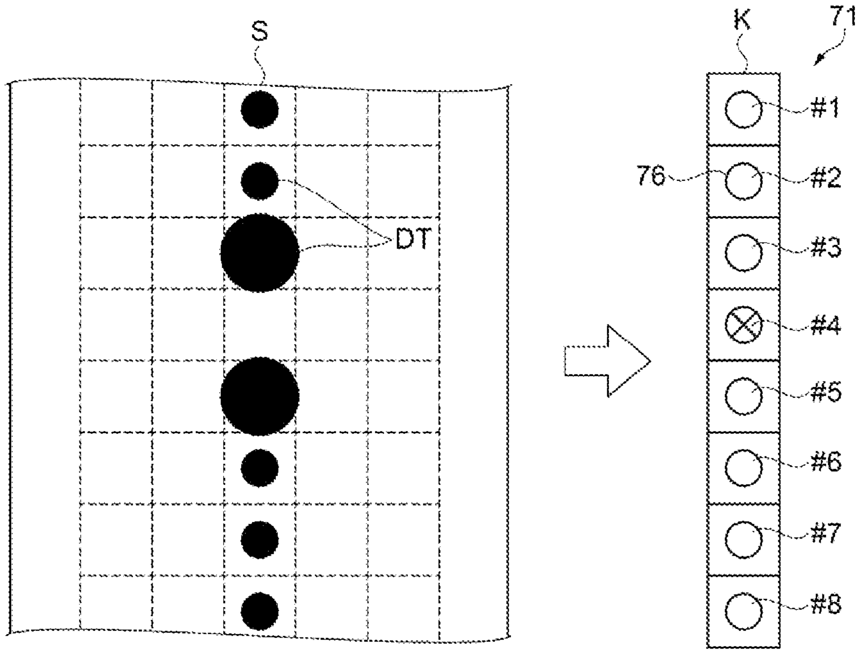
FIG. 8B is a diagram illustrating an example of complementary printing.

As illustrated in FIG. 8A, for example, printing data is for printing of a ruled line formed of the dots DT aligned in a line on the medium S by discharging ink from the nozzles 76 of #1 to #8 in a path of moving the head 71 in the arrow direction. As illustrated in FIG. 8B, in the case where the nozzle 76 of #4 is determined to be an abnormal nozzle, the control unit 10 executes complementary printing in which the amount of ink to be discharged from the nozzles 76 of #3 and #5 is increased. In this case, the nozzles 76 of #3 and #5 are complementary nozzles that complement the nozzle 76 of #4 as the abnormal nozzle. In this manner, the gap between the dot DT formed by the nozzle 76 of #3 and the dot DT formed by the nozzle 76 of #5 is reduced, and it can be visually recognized as a single ruled line. In the case of printing data for printing the ruled line illustrated in FIG. 8A, the control unit 10 determines that the complementary printing is impossible also when abnormal nozzles are continuously detected, in addition to the above-mentioned threshold value.

Figure 9A:
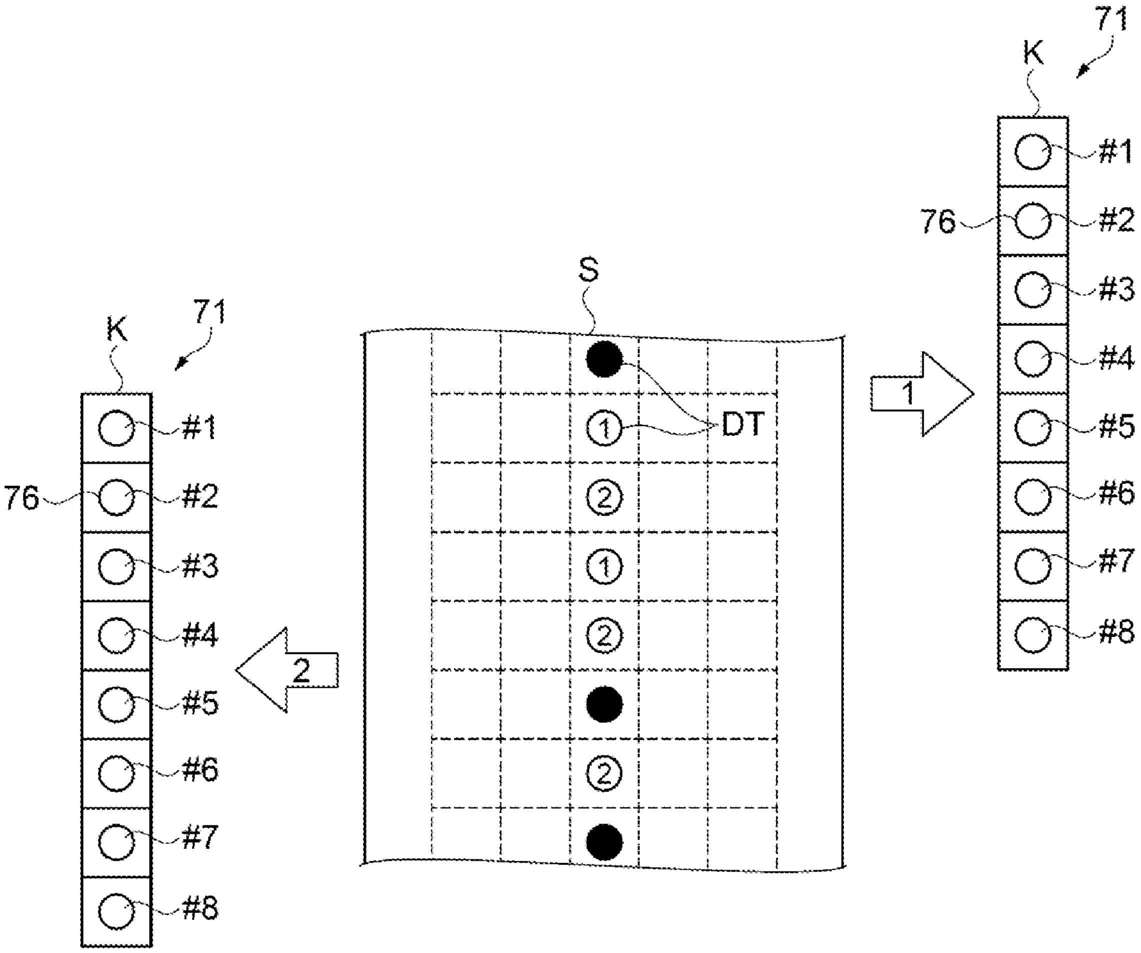
FIG. 9A is a diagram illustrating an example of a normal printing.
Figure 9B:
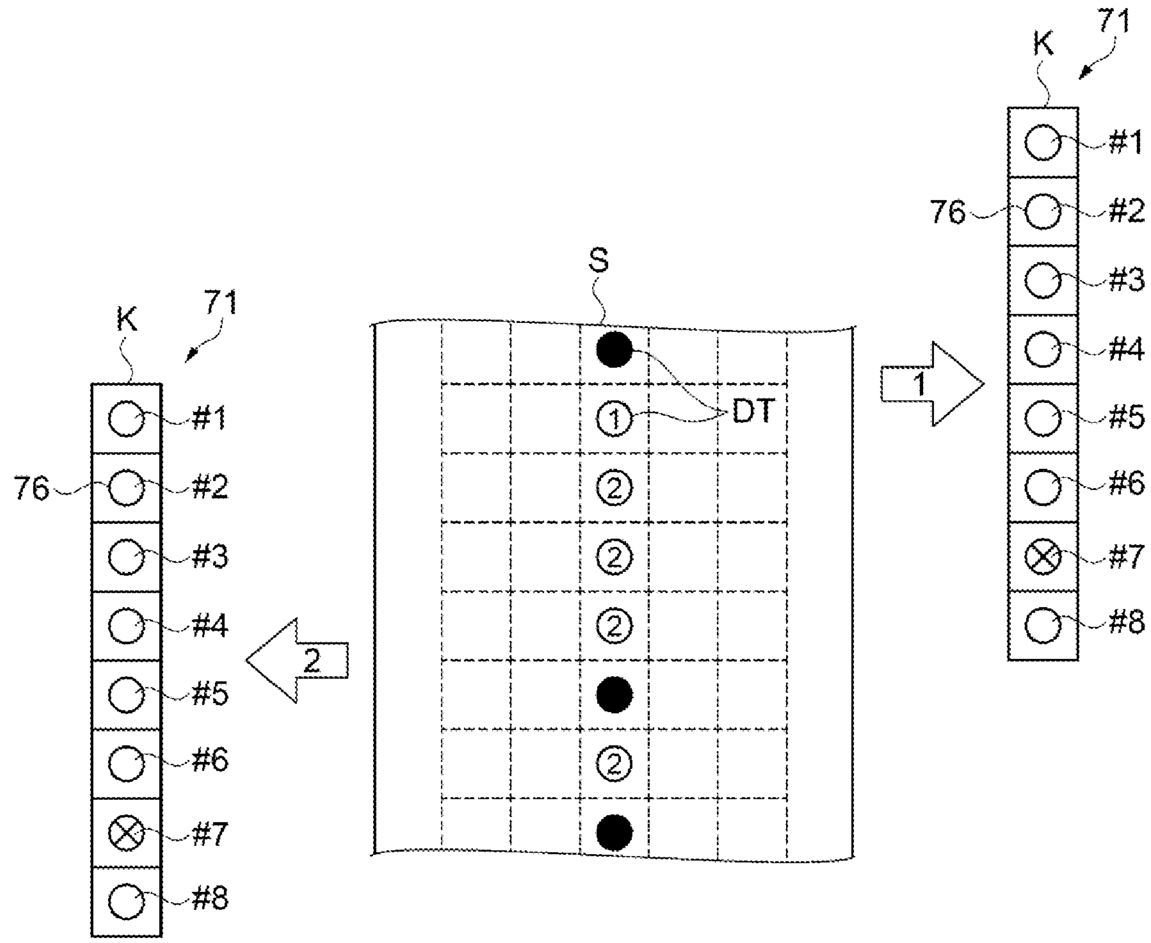
FIG. 9B is a diagram illustrating an example of complementary printing.

In addition, as illustrated in FIG. 9A, for example, printing data is for printing of a ruled line formed of the dots DT aligned in a line on the medium S by discharging ink from odd-numbered nozzles 76 in the first path of moving the head 71 in the direction of the arrow indicated with "1", and discharging ink from even-numbered nozzles 76 in the second path of moving the head 71 in the direction of the arrow indicated with "2" after conveying the medium S by four dots in the conveyance direction. Note that in FIG. 9A, the dots DT formed in the first path are indicated with encircled "1", and the dots DT formed in the second path are indicated with encircled "2". In addition, the black circles indicate the dots DT formed in paths other than the first path and second path. As illustrated in FIG. 9B, in the case where the nozzle 76 of #7 is determined to be an abnormal nozzle, the control unit 10 executes complementary printing in which the dot DT that is normally formed by the nozzle 76 of #7 in the first path is formed by the nozzle 76 of #3 in the second path. In this case, the nozzle 76 of #3 is a complementary nozzle that complements the nozzle 76 of #7 as an abnormal nozzle. Note that in FIG. 9A and FIG. 9B, the head 71 moves in the conveyance direction with respect to the medium S for convenience of description, but in practice, the medium S moves in the conveyance direction with respect to the head 71. In the case of the printing data for printing the ruled line illustrated in FIG. 9A, the control unit 10 determines that the complementary printing is impossible also when the nozzles 76 in a complementary relationship with each other are simultaneously detected as abnormal nozzles, in addition to the above-mentioned threshold value.

Step S107 is a nozzle complement step of performing a nozzle complement process on printing data. In the case where an abnormal nozzle is detected and contact between the head 71 and the medium S is not detected, it is highly possible that nozzle clogging has occurred due to a bubble mixed in the ink that is smaller than the diameter of the nozzle 76. Small bubbles can be ejected through a suction operation executed on a predetermined schedule even after solidification, and the discharging of the nozzle 76 where nozzle clogging is caused can be restored. In view of this, to continue the printing operation, the control unit 10 regenerates printing data for executing printing for complementing the abnormal nozzle. The control unit 10 generates a discharging control signal and a drive control signal for driving the complementary nozzle that complements the abnormal nozzle.

Step S108 is a main scanning execution step of executing the main scanning. The control unit 10 executes the path on the basis of the printing data, and terminates this flow. Note that this flowchart is repeatedly executed for each path of a plurality of paths for forming images. In addition, step S101 to step S104 are described as separate steps for convenience of description above, but in practice, the steps are substantially simultaneously executed.

Note that while an example of a configuration in which the contact detection unit 90 is provided upstream and downstream of the head 71 along the conveyance direction is described in this embodiment, it is also possible to adopt a configuration in which the contact detection unit is provided upstream and downstream of the head 71 that moves along the main scanning direction.

In addition, while an example of the printing apparatus 1 of a serial-head type in which the head 71 mounted in the carriage 72 that moves back and forth and configured to discharge ink while moving in the width direction of the medium S is described in this embodiment, it is also possible to adopt a printing apparatus of a line-head type in which it is extended and arranged in a fixed manner in the width direction of the medium S.

As described above, according to the printing apparatus 1 and the printing method according to this embodiment, the following effect can be obtained.

The printing apparatus 1 includes the abnormal nozzle detection unit 150 that detects an abnormal nozzle having a discharging defect, the contact detection unit 90 that detects contact between the head 71 and the medium S, and the suction unit 95 as an ejection unit that ejects ink from the plurality of nozzles 76.

It is highly possible that the abnormal nozzle that is detected when contact between the head 71 and the medium S is detected has a discharging defect due to mixing of bubbles larger than the diameter of the nozzle 76 into the nozzle 76 due to rubbing of the nozzle 76 against the medium S. Solidification of large bubbles makes it difficult to restore the discharging defect, and it is therefore necessary to eject the bubbles before the solidification occurs, by immediately executing the suction operation as an example of the ejection operation. On the other hand, it is highly possible that the abnormal nozzle detected with no detection of contact between the head 71 and the medium S has a discharging defect due to bubbles mixed in the ink that are smaller than the diameter of the nozzle 76. In the case of small bubbles, the discharging defect can be restored by executing the suction operation even after solidification. In view of this, in the case where an abnormal nozzle is detected and contact between the head 71 and the medium S is not detected, the control unit 10 executes printing of complementing the abnormal nozzle. In this manner, the number of times of the suction operations that entail interruption of the printing operation is reduced. Thus, the printing apparatus 1 that improves the printing efficiency can be provided.

The control unit 10 executes the suction operation when the number of detected abnormal nozzles is equal to or greater than a threshold value. When the number of abnormal nozzles is large, degradation in image quality due to the complementary printing is visually recognized. The control unit 10 executes the suction operation when the number of abnormal nozzles is equal to or greater than the threshold value, and thus can increase the printing efficiency while suppressing the degradation in image quality.

The head 71 includes the piezoelectric element 172 as an actuator that causes discharging of ink. The abnormal nozzle detection unit 150 detects an abnormal nozzle on the basis of the residual vibration of the piezoelectric element 172, and thus can favorably detect the abnormal nozzle in the ink-jet head 71 using the piezoelectric element 172.

The distance sensor 91 is provided upstream and downstream of the head 71 along the conveyance direction. In this manner, a contact with the head 71 due to floating of the medium S occurred upstream and a contact with the head 71 due to floating of the medium S occurred downstream can be favorably detected.

The printing method includes a step of detecting an abnormal nozzle having a discharging defect, a step of detecting contact between the head 71 and the medium S, and a step of executing a suction operation as an example of an ejection operation of ejecting ink from the head 71.

It is highly possible that the abnormal nozzle that is detected when contact between the head 71 and the medium S is detected has a discharging defect due to mixing of bubbles larger than the diameter of the nozzle 76 into the nozzle 76 due to rubbing of the nozzle 76 against the medium S. Solidification of large bubbles makes it difficult to restore the discharging defect, and it is therefore necessary to discharge bubbles before the solidification, by immediately executing the suction operation. On the other hand, it is highly possible that the abnormal nozzle detected with no detection of contact between the head 71 and the medium S has a discharging defect due to bubbles mixed in the ink that are smaller than the diameter of the nozzle 76. In the case of small bubbles, the discharging defect can be restored by executing the suction operation even after solidification. In view of this, the printing method of the printing apparatus 1 includes a step of executing a printing of complementing the abnormal nozzle when an abnormal nozzle is detected and contact between the head 71 and the medium S is not detected. In this manner, the number of times of the suction operations that entail interruption of the printing operation is reduced. Thus, the printing method that improves the printing efficiency of the printing apparatus 1 can be provided.

What is claimed is:

1. A printing apparatus comprising:
- a head including a plurality of nozzles configured to discharge liquid to a medium;
- an abnormal nozzle detection unit configured to detect an abnormal nozzle having a discharging defect among the plurality of nozzles;
- a contact detection unit configured to detect contact between the head and the medium;
- an ejection unit configured to perform an ejection operation of ejecting the liquid from the plurality of nozzles; and
- a control unit, wherein
- the control unit executes the ejection operation when the abnormal nozzle is detected and the contact between the head and the medium is detected,
- the control unit executes complementary printing of complementing the abnormal nozzle when the abnormal nozzle is detected and the contact between the head and the medium is not detected, and
- the contact detection unit is provided upstream or downstream of the head along a conveyance direction in which the medium is conveyed.

2. The printing apparatus according to claim 1, wherein the control unit executes the ejection operation when a number of the abnormal nozzles detected is equal to or greater than a threshold value.

3. The printing apparatus according to claim 1, wherein
- when the abnormal nozzle is detected and the contact between the head and the medium is not detected, the control unit determines whether the complementary printing is executable;
- the control unit executes the complementary printing when the complementary printing is executable; and
- the control unit executes the ejection operation when the complementary printing is not executable.

4. The printing apparatus according to claim 1, wherein
- the head includes a piezoelectric element as an actuator for discharging the liquid; and
- the abnormal nozzle detection unit detects the abnormal nozzle on a basis of a residual vibration of the piezoelectric element that is caused after the liquid is discharged.

5. The printing apparatus according to claim 1, wherein
- the contact detection unit is a distance sensor of ultrasound type; and.

6. A printing method of a printing apparatus, the printing apparatus including:
- a head including a plurality of nozzles configured to discharge liquid to a medium;
- an abnormal nozzle detection unit configured to detect an abnormal nozzle having a discharging defect among the plurality of nozzles;
- a contact detection unit configured to detect contact between the head and the medium, wherein the contact detection unit is provided upstream or downstream of the head along a conveyance direction in which the medium is conveyed; and
- an ejection unit configured to perform an ejection operation of ejecting the liquid from the plurality of nozzles, the method comprising:
- detecting the abnormal nozzle;
- detecting the contact between the head and the medium;
- executing the ejection operation when the abnormal nozzle is detected and the contact between the head and the medium is detected; and
- executing complementary printing of complementing the abnormal nozzle when the abnormal nozzle is detected and the contact between the head and the medium is not detected.

* * * * *